Jan. 4, 1944.  R. M. NARDONE  2,338,594
ENGINE STARTING MECHANISM
Original Filed Aug. 8, 1940   2 Sheets-Sheet 1

Inventor
Romeo M. Nardone
By Martin J. Finnegan
Attorney

Jan. 4, 1944. R. M. NARDONE 2,338,594
ENGINE STARTING MECHANISM
Original Filed Aug. 8, 1940 2 Sheets-Sheet 2
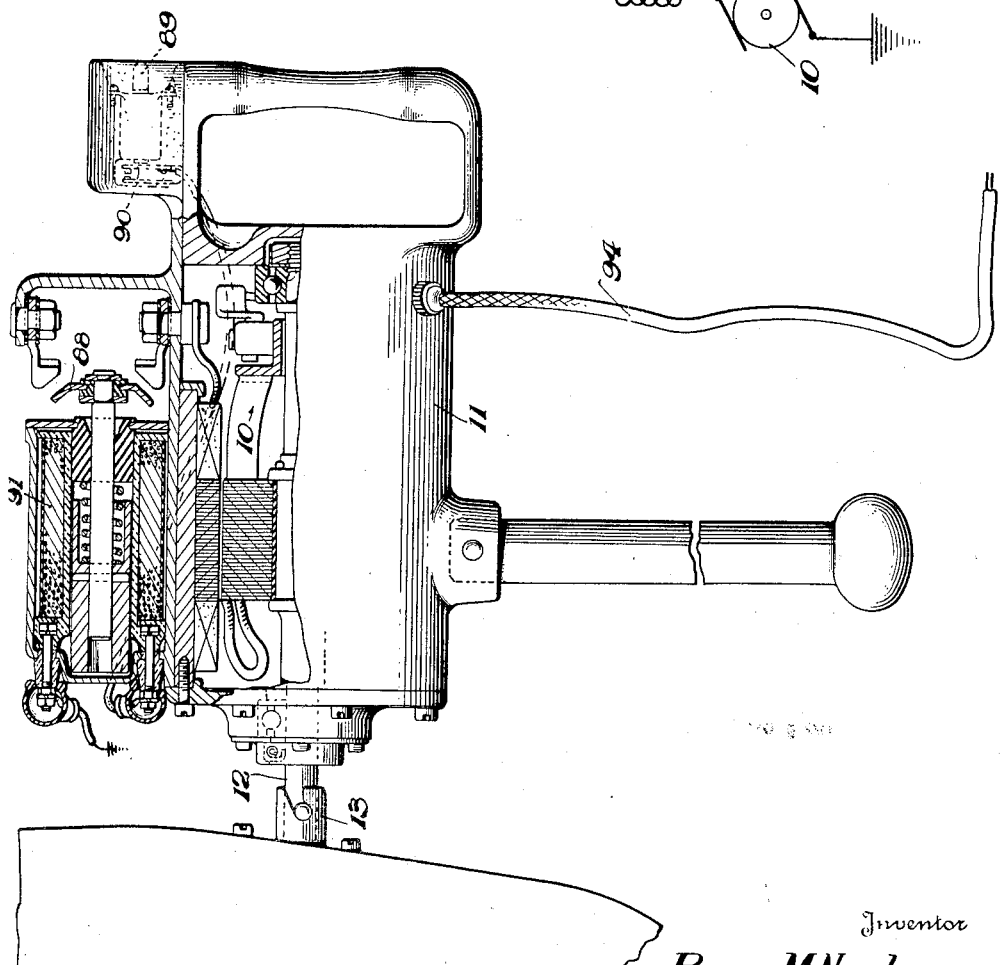
Inventor
Romeo M. Nardone.
By Martin J. Finnegan
Attorney Patented Jan. 4, 1944

2,338,594

UNITED STATES PATENT OFFICE 2,338,594

ENGINE STARTING MECHANISM

Romeo M. Nardone, Westwood, N. J., assignor to Bendix Aviation Corporation, South Bend, Ind., a corporation of Delaware Original application August 8, 1940, Serial No. 351,831. Divided and this application September 26, 1942, Serial No. 459,819

1 Claim. (Cl. 172—36)

This invention relates to engine starting mechanism, and more particularly to the starting of the several engines constituting the complete power plant of a heavier-than-air flying device such as an airplane or dirigible.

An object of the invention is to provide for the successive cranking of the several engines of a multi-engine aircraft by the successive application thereto of a portable prime mover adapted to transmit starting torque thereto through connections operating to transmit such torque directly and through the instrumentality of an automatically engaged and disengaged clutch mechanism, the engagement of which is immediate in response to the coupling of the portable prime mover into operative position in relation thereto, and the disengagement of which follows immediately upon development of self-sustaining speed in the engine itself.

Another object is to provide a portable unit for the described purpose and characterized by novel features in the construction and inter-relationship of parts.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claim for this purpose.

In the drawings:

Fig. 2 is a view, partly in section and partly in elevation, showing the complete prime mover including the manual supporting means therefor and the cable leading therefrom to the source of energy; and Fig. 3 is a wiring diagram showing the electrical connections involved for energization of the prime mover shown in Fig. 2.

Figure 1:
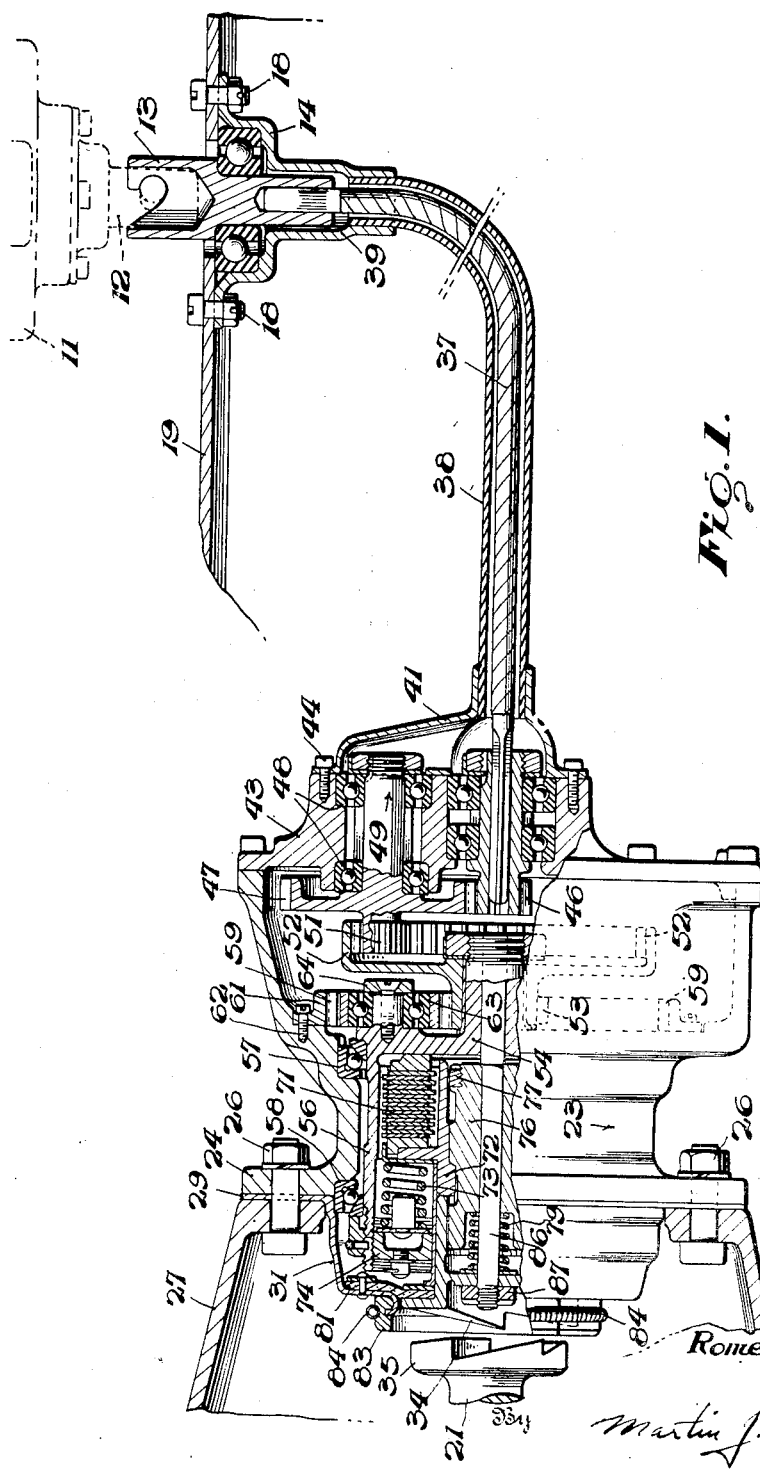
Fig. 1 is a view, partly in section and partly in elevation, of a device embodying the invention, as said device appears when in position for the starting of one of a series of engines to be successively started; the view showing, however, only one end of the portable prime mover constituting a component part of the device.

In the drawings the prime mover is shown as enclosed within a portable housing 11 from which extends the armature driven shaft 12 having the conventional type of pin and cam slot attachment to the coupling member 13 rotatably mounted in a ball-bearing receiving casing 14 which is bolted or otherwise fixedly secured, as indicated at 18, to a portion 19 of the cowling which encloses the power plant portion of the aircraft. The transmission mechanism which drivably connects the prime mover to the engine crankshaft (or engine crankshaft connected element) 21 is shown as enclosed within a sectional housing constituted by a central section 23 having a flange 24 to receive bolts 26 by which the unit is anchored to a portion 27 of the crankcase or housing enclosing the engine crankshaft, the said anchoring means also serving to secure the flange 29 of the inwardly extending member 31 in which are received certain parts (hereinafter described) which influence the action of the automatically engaging clutch element 34 in which the torque transmitting elements of the unit terminate. The flexible shaft 37 which drivably connects the prime mover with the transmission mechanism is enclosed in a flexible housing 38 which is secured at one end to the extension 39 of the coupling housing and at its opposite end to the closure plate 41 which fastens to the section 43 of the transmission unit housing as indicated at 44. Drivably connected to the flexible shaft is a pinion 46 that meshes with a spur gear 47. The housing section 43 supports therein a pair of bearings 48 that are maintained in spaced relation by means of a sleeve carried on a lay shaft 49 which is rotatably supported by said bearings and which, in the form of the invention illustrated, is integral with the spur gear 47. Also integral with gear 47 is a pinion 51 adapted to engage an internal gear 52.

Gear 52 is preferably made integral with a small spur gear 53, and the two gears are rotatably mounted, as by means of a bushing, on a stub shaft 54 that extends outwardly from, and is drivably connected to, a barrel 56 having a closed end, the stub shaft 54 being integral with said closed end in the illustrated embodiment of the invention. Ball-bearings 57, 58, carried by the inner housing section 23, are preferably employed for rotatably mounting the barrel 56.

Gear 53 constitutes a sun gear for a plurality of planetary gears 59 that are rotatably mounted on the barrel end, and mesh with an internal gear 61 which is fixedly mounted within the housing by means of screws 62. Preferably three planetary gears 59 are employed, and one of these is shown in section in Fig. 1. These gears 59 are preferably spaced 120° apart, and each of the planetary gears is rotatably mounted by means of a ball-bearing 63 carried by a cylindrical part which is integral with or countersunk at its inner end in the end wall of barrel 56. Extending through these carrying parts, and threaded into the barrel end, are screws which support a retaining ring 64 for the bearings and planetary gears.

The electric motor shaft 12 is adapted to drive the engine engaging member 34 through the train of reduction gearing described above. The member 34 constitutes one element of a jaw clutch, the other clutch element 35 being formed integral with or carried by the rotating part 21 of the engine to be cranked.

There is preferably employed a multiple disc clutch embodying a plurality of friction discs 71, a number of said discs being splined to the inner surface of barrel 56, and the remainder being splined to the outer surface of an interiorly threaded nut 72. Resilient means such as a plurality of coil springs 73 and an adjusting nut 74, which is threaded into the inner end of barrel 56, are provided for varying the pressure with which discs 71 are maintained in engagement.

Mounted for rotary and longitudinal movement within nut 72 is a threaded shaft 76 which is longitudinally splined at its inner end to drivably engage a correspondingly splined, tubular hub portion of the jaw clutch member 34. Movement of threaded shaft 76 to the left, as viewed in Fig. 1, relative to nut 72, is positively limited by means of a member 77 threaded on the outer end of shaft 76 and constituting a stop shoulder for engagement with a shoulder formed interiorly of nut 72. Preferably a coil spring 79 is interposed between jaw clutch member 34 and shaft 76, a portion of said spring extending into a recess formed in the inner end of the shaft, to yieldingly resist relative movement of the clutch member towards the shaft.

The starter is preferably provided with oil sealing means for preventing oil in the engine crankcase 27 from seeping into the starter housing. For this purpose the inner portion of member 31 is bent inwardly toward jaw member 34, and is provided with a central opening which is slightly larger in diameter than the outer diameter of the head of jaw member 34. Preferably member 31 is strengthened adjacent said opening by being bent or curved, and carries a washer 81 that may be formed of leather and is secured in any suitable manner to the shoulder adjacent the bend of member 31. Normally the central portion of washer 81 is held in engagement with the adjacent surface of the head of jaw member 34 by means of a sleeve which slidably surrounds the cylindrical portion of the jaw clutch member and abuts at its opposite end against a flange provided on nut 72. The above described oil seal means is not claimed per se in this application as it constitutes the subject matter of claims in Patent No. 1,962,397 granted to Raymond P. Lansing on June 12, 1934. Preferably—as in said Lansing patent No. 1,962,397—the outer periphery of member 34 carries a split-ring 83 retained in position by means of a surrounding resilient member 84 in the form of a coil spring which rests in an annular groove formed in the outer periphery of said ring 83. The latter is adapted to rotate on the curved lip surrounding the central opening in member 31.

As has been pointed out, it is desirable for shaft 76 and jaw clutch member 34 to have relative longitudinal movement, but these elements must rotate in unison. For this purpose the two parts are splined together as previously described. It is also desirable to provide means for retaining these parts in operative relationship in order that the driving connection between the same may not be interrupted due to excessive relative longitudinal movement thereof. For this purpose there is provided a rod 86 which slidably extends through stub shaft 54, threaded shaft 76 and a central opening in the member 34. The inner portion of rod 86 is of reduced diameter to provide a shoulder which normally abuts against the outer end of shaft 76. The inner end of rod 86 is threaded to receive a nut 87 which abuts against the hub of jaw member 34 and coacts with the shoulder on rod 86 to retain member 34 and 76 in operative relationship.

As indicated in Figs. 2 and 3, the portable unit preferably includes a magnetically actuated switch 88 and a manually operated switch 90, the latter being closeable by a push button 89, and its contacts being in series with the winding of an electromagnet 91 and also in series relationship to the source of current 92 by way of the conductor 93 which is one of the conductors passing through the cable indicated at 94 in Fig. 2. The first-named switch, when closed, allows passage of current from the source 92 to the windings of the motor 10 as indicated by the connections in Fig. 3, and torque is thereby developed for transmission to the engine crankshaft by way of the flexible shaft, gear train, and yieldable clutch heretofore described, the rotation of said parts being effected to produce automatic engagement between the clutch elements in the manner corresponding to that described in the prior art patents such as, for example, the Lansing Patent No. 1,962,397 above referred to. Upon starting of the engine and the resulting automatic disengagement of the clutch element, the operator uncouples the portable unit and transfers the same to the corresponding fixture associated with the next engine of the series of engines to be started; the connection of the prime mover to the source of current being maintained by reason of the connecting cable 94, although the flow of current is, of course, interrupted at will by opening the switch 90.

This application is a division of my copending application No. 351,831, filed August 8, 1940.

What is claimed is:

A portable aircraft accessory including an electric motor having an armature shaft engaging a rotatable element carried by the aircraft, an energizing circuit for said motor, said energizing circuit including a normally open switch, means for closing said normally open switch, said closing means including a solenoid mounted on said portable accessory, and means for holding said motor in driving engagement with said rotatable element, said holding means comprising a handle having its axis disposed in a vertical line which intersects the longitudinal axis of said motor, and also the longitudinal axis of said solenoid, cutting said motor axis near the center of gravity of said motor.

ROMEO M. NARDONE.